United States Patent [19]
Daghe et al.

[11] Patent Number: 5,207,242
[45] Date of Patent: May 4, 1993

[54] ANGLE DUAL CHECK VALVE

[75] Inventors: Joseph L. Daghe; Steven R. Tefft, both of Dubuque, Iowa

[73] Assignee: A. Y. McDonald Mgf. Co., Dubuque, Iowa

[21] Appl. No.: 911,150

[22] Filed: Jul. 9, 1992

[51] Int. Cl.$^5$ ............................................ F16K 15/02
[52] U.S. Cl. ................................ 137/454.6; 137/512; 137/543.15
[58] Field of Search ................ 137/512, 543.15, 454.2, 137/454.6

[56] References Cited

U.S. PATENT DOCUMENTS

| | | | |
|---|---|---|---|
| 538,831 | 5/1895 | Heintzelman | 137/512 |
| 562,267 | 6/1896 | Albin | 137/512 |
| 1,512,597 | 10/1924 | Harmon | 137/512 |
| 1,861,396 | 5/1932 | Isbell | 137/512 X |
| 1,871,969 | 8/1932 | Elsey | 137/543.15 X |
| 1,960,963 | 5/1934 | Wheeler et al. | 137/454.2 |
| 2,023,189 | 12/1935 | Armstrong | 137/543.15 X |
| 2,845,085 | 7/1958 | Robbins | 137/512 X |
| 4,232,704 | 11/1980 | Becker et al. | 137/512 X |
| 4,893,654 | 1/1990 | Feuz | 137/512 X |
| 5,080,122 | 1/1992 | Neuzeret | 137/543.15 X |

Primary Examiner—John Rivell
Attorney, Agent, or Firm—Wood, Phillips, VanSanten, Hoffman & Ertel

[57] ABSTRACT

An angled check valve has a valve housing with an inlet for admitting fluid flow into the housing in a first direction and an outlet for discharging fluid flow from the housing in a second direction. The first direction and the second direction are generally perpendicular. An inlet check assembly in the housing has a valve member movable in the first direction for preventing fluid flow from exiting the housing through the inlet. An outlet check assembly in the housing has a valve member movable in the second direction for preventing fluid flow from entering the housing through the outlet. In order to facilitate assembly and service of the check valve, the housing has an opening extending in the second direction through which the inlet check assembly and the outlet check assembly can be assembled into and removed from the housing.

19 Claims, 2 Drawing Sheets

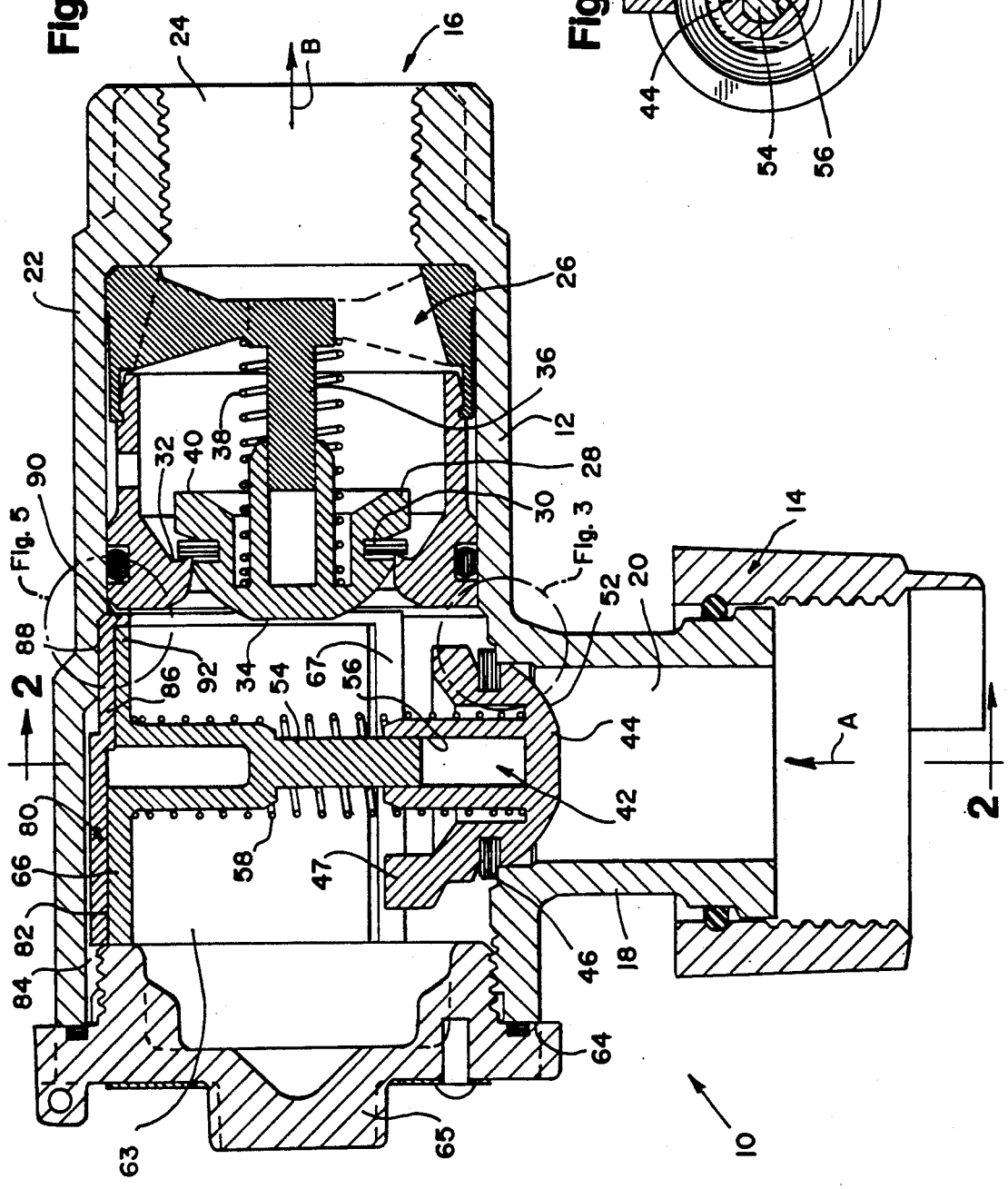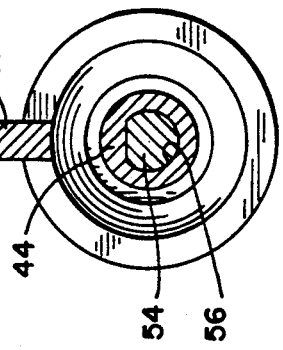

ANGLE DUAL CHECK VALVE

FIELD OF THE INVENTION

This invention relates to a check valve for preventing backflow of fluid along a flow path, and more particularly, a check valve having an outlet flow which is discharged at a right angle with respect to the direction of an inlet flow.

BACKGROUND OF THE INVENTION

Check valves conventionally are used in applications where it is desirable to allow a flow of fluid in one direction and to prevent flow in the reverse direction. For instance, a check valve (or one-way valve) is used to prevent the backflow of water from a residence or business into a public water supply to avoid the risk of contaminating the water supply and incurring potential health hazards.

To achieve the function described above, check valves typically have a movable valve member which is seated on a valve inlet and/or a valve outlet when the check valve is in a closed or shunted position. When the valve member is unseated from the respective inlet or outlet, the check valve is opened and a "forward" flow is induced.

An inlet valve member typically is constructed so that it is unseated only in response to fluid pressure on the upstream side of the inlet, whereby a "backflow" on the downstream side of the inlet is ineffective to unseat the inlet valve member and open the valve. Similarly, an outlet valve member is constructed so that it is unseated only in response to fluid pressure on the upstream side of the inlet, whereby a "backflow" on the downstream side of the outlet is ineffective to unseat the outlet valve member and open the check valve.

It generally is known to employ, redundantly, both an inlet valve member and an outlet valve member to achieve a preferred degree of reliability in a check valve. In prior constructions the valve members have been arranged "in-line" in a housing such that the valve members are movable along a common axis to alternatively open and close the check valve.

It has become desirable to provide a check valve in which an outlet flow is discharged from the valve in a direction substantially perpendicular to the direction at which an inlet flow enters the valve. Angled check valves have been developed in response to the demand. An angled check valve embodies a substantially L-shaped flow path wherein a flow enters the check valve in a first direction and exits the check valve at a direction ninety degrees from the inlet direction.

Prior angled check valves have an inlet valve member and an outlet valve member positioned in an in-line arrangement, with each valve member being movable along a longitudinal axis in the valve housing. The axis along which the valve members are movable is aligned with either the outlet flow direction or the inlet flow direction. Because the valve housing must also provide a transverse port for directing the other of either the outlet flow or the inlet flow through the housing, the housing necessarily is, undesirably, quite large or long. In addition to the burdens imposed by the inherent excess weight and cost associated with a large check valve housing, such a check valve often is unsuitable for use in applications having restrictive envelope requirements.

The present invention is directed toward overcoming one or more of the problems set forth above.

SUMMARY OF THE INVENTION

It is an object of the present invention to provide an improved angled check valve having dual valve members arranged in a compact check valve housing In the exemplary embodiment of the invention, an angled check valve has a valve housing with an inlet for admitting a flow in a first direction into the housing and outlet for discharging a flow in a second direction from the housing. The first direction and the second directions are substantially perpendicular.

An inlet check assembly and an outlet check assembly is provided in the housing. The inlet check assembly has an inlet valve member for preventing a flow from exiting the housing through the inlet, and the outlet check assembly has an outlet valve member for preventing a flow from entering the housing through the outlet. In order to reduce the packaging requirements for the check assemblies and to minimize the housing envelope, the inlet valve member moves in the first direction to open the inlet and the outlet valve member moves in the second direction to open the outlet.

The check valve has an inlet with a peripheral surface for seating the inlet valve member when the inlet valve member is in the closed position. The peripheral surface around the inlet has an inner edge which advantageously is adapted to provide a circular line contact with the inlet valve member and thereby reduce the time required for effectively opening and closing the inlet. More specifically, the peripheral surface is angled away from the inner edge and opposite the first direction.

In order to facilitate assembly and service of the check valve, the housing has a generally cylindrical opening extending in the second direction. The inlet check assembly and the outlet check assembly are assembled into and removed from the housing through the opening. A removable plug seals the opening during operation of the check valve.

The inlet valve member is aligned with the inlet by means of a first locator member received in the housing opening. The locator member has an axially extending tubular shell with a radial stem extending in the first direction, and the inlet valve member has an opening for receiving the stem such that the inlet valve member thereby is guided for movement in the first direction. A biasing spring is interposed between the locator member and the inlet valve member to urge the same into sealing engagement with the inlet. The inlet valve member has a removal lug accessible through the opening in the housing, and the stem is keyed to the opening in the inlet valve member to prevent rotation of the inlet valve member and to maintain accessibility of the removal lug from the housing opening.

A second locator member envelops the first locator member and maintains the outlet check assembly in a position adjacent to the outlet. More specifically, the second locator member has an axially extending tubular shell embracing the first locator member.

An axially inner end of the second locator member has a radially extending lip for limiting axial movement of the first locator member relative to the second locator member. Stops are provided on the inner surface of the shell on the second locator member to limit coaxial rotation of the first locator member relative to the second locator member. A radially extending tab on the exterior of the shell on the second locator member is received in a notch on the housing inner wall to prevent coaxial rotation of the second locator member relative to the housing.

The removable plug has an axial hub extending into the housing and engaging an outer axial end of the first locator member and the second locator member. The plug forces an edge on the inner axial end of the second locator member into a positive line contact with an angled surface on the housing interior to precisely locate the first locator member and the inlet valve member.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and advantages, may be best understood by reference to the following description taken in conjunction with the accompanying drawings, in which like reference numerals identify like elements in the figures and in which:

FIG. 1 is an axial section through a check valve according to the present invention;

FIG. 4 is a section taken generally along line 4—4 in FIG. 2; and

DESCRIPTION OF THE PREFERRED EMBODIMENT

Figure 2:
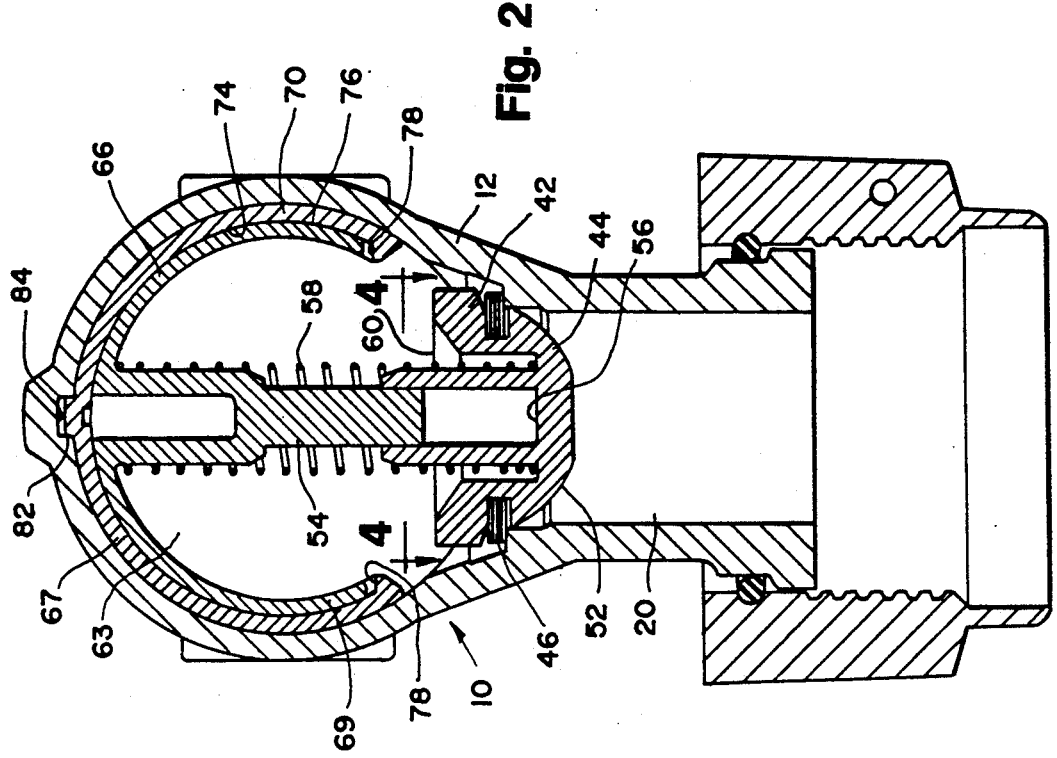
FIG. 2 is a section taken generally along line 2—2 of FIG. 1.
Figure 5:
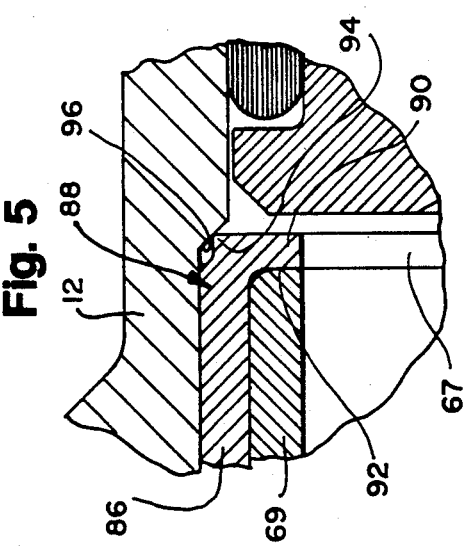
FIG. 5 is an enlarged view of the area marked FIG. 5 in FIG. 1.

Referring to FIGS. 1 and 2, and first to FIG. 1, an exemplary check valve is generally designated 10 and has a substantially L-shaped housing 12. The housing has inlet means, generally designated 14, for admitting a flow of fluid into the housing in a direction represented by the arrow "A", and outlet means, generally designated 16, for discharging a flow from the housing in a direction represented by the arrow "B". As illustrated, direction "A" is substantially perpendicular to direction "B".

More particularly, inlet means 14 has a tubular leg 18 integral with housing 12 and which defines an axial opening or inlet 20 for admitting a flow into check valve 10. Outlet means 16 has a transverse leg 22 which defines an axial opening or outlet 24 for discharging a flow from the check valve. Thus, fluid under pressure is admitted into housing 12 through inlet 20 and is diverted substantially ninety degrees within the housing and is discharged through outlet 24.

An outlet check assembly, generally designated 26, is disposed in transverse leg 22 for preventing a flow from entering the housing through outlet 24. Outlet check assembly 26 has a valve member or poppet 28 with an annular gasket member 30. When the outlet check assembly is in a closed position (as shown in the Figures), gasket member 30 engages a seat 32 to prevent a flow through outlet 24. The application of fluid pressure to the upstream side 34 of poppet 28 disengages the poppet from seat 32 and permits a discharge through the outlet.

More particularly, poppet 28 is guided for movement in the direction "B" along an axial stem member 36. Movement of poppet 28 is biased by a spring 38 interposed between poppet 28 and stem member 36, such that, in the absence of an upstream fluid pressure, poppet 28 is urged to the closed position. Interference between poppet 28 and seat 32 prevents the outlet check assembly from opening when fluid pressure is applied to the downstream side 40 of the poppet and thereby prevents a backflow from entering the check valve through outlet 24.

An inlet check assembly, generally designated 42, is disposed in leg 18 of housing 12 for preventing a flow from exiting the housing through inlet 20. Specifically, inlet check assembly 42 has a valve member or poppet 44 with an annular gasket member 46. Poppet 44 has an integral lug 47 for purposes to be described hereafter.

Figure 3:
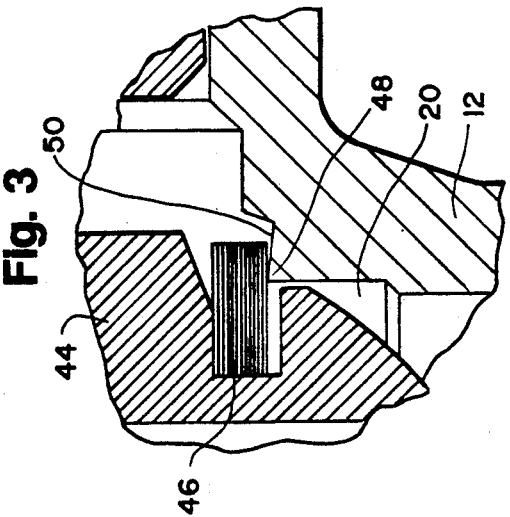
FIG. 3 is an enlarged view of the area marked FIG. 3 in FIG. 1.

As shown in greater detail in FIG. 3, when the inlet check assembly is in a closed position, gasket member 46 seats on an inner (circular) edge 48 of a peripheral (annular) surface 50 which surrounds inlet 20. Peripheral surface 50 is angled away from inner edge 48 and opposite the direction "A" to establish a circular line contact, at edge 48, between housing 12 and gasket member 46. The application of fluid pressure to the upstream side 52 of poppet 44 disengages the poppet from edge 48 and permits a flow through inlet 20. Line contact between poppet 44 and edge 48 provides an immediate flow through inlet 20 when the poppet 44 is actuated.

Poppet 44 is guided for movement in the direction "A" along an axial stem member 54. Stem member 54 is received in an axial opening 56 in poppet 44 and is rotatably keyed thereto by means of an irregular complementary cross section on the stem member and the opening (see also FIG. 4). Movement of poppet 44 is biased by a spring 58, such that in the absence of a fluid pressure, poppet 44 is urged against edge 48 and into a closed position. Line contact between poppet 44 and edge 48 provides a more immediate seal across inlet 20 when the poppet is closed. Interference between poppet 44 and edge 48 prevents inlet check assembly 42 from opening when a fluid pressure is applied to the downstream side 60 of the poppet.

Similarly, valve seat 32 on outlet check assembly 26 is angled away from gasket member 30 and opposite the direction "B". In the manner described previously with respect to operation of poppet 40, angled valve 32 provides an immediate flow through outlet 24 when the poppet 28 is actuated. Also as described with respect to poppet 40 on inlet check assembly 42, line contact between valve seat 32 and gasket member 30 provides a more immediate seal when poppet 28 is closed.

Locator means, generally designated 62, are provided for maintaining outlet check assembly 26 adjacent outlet 24 and for aligning stem member 54 and poppet 44 of inlet check assembly 42 with inlet 20. Locator means 62 are disposed in a generally cylindrical opening 63 in housing 12. As best shown in FIG. 1, opening 63 extends axially in the direction "B" and communicates with a side face 64 of the housing. A removable plug 65 is threadedly engaged with opening 63 when check valve 10 is assembled.

It should be understood that a unique advantage of the present invention is that outlet check assembly 26 and inlet check assembly 42 are assembled into and removed from the housing through opening 63 to facilitate assembly and service of check valve 10. To that end, lug 47 on poppet 44 extends upwardly and into opening 63 such that when plug 65 is disengaged from housing 12, access is gained for grasping the lug and removing inlet check assembly 42 from the housing. Accessibility of lug 47 is maintained by the keyed engagement of stem member 54 and poppet opening 56.

Locator means 62 has an internal locator member 66 integral with stem member 54 and an external locator member 68. Internal locator member 66 has an axially extending tubular shell 69 aligned coaxially with cylindrical opening 63. External locator member 67 has an axially extending tubular shell 70 interposed between housing 12 and tubular shell 69 and is aligned coaxially with cylindrical opening 63. An inner surface 74 on shell 70 slidably embraces an outer surface 76 on shell 69. Inner surface 74 has a pair of circumferentially spaced stops 78 for limiting relative rotation between internal locator member 66 and external locator member 67.

Tubular shell 69 has a stepped land 80. Land 80 has a first step 82 received in an axial groove 84 in housing 12 to prevent relative rotation between external locator member 67 and housing 12. Land 80 has a second step 86 slidably engaged with the interior of housing 12 to effect a seal therebetween. slidably embraces an outer surface 76 on shell 69. Inner surface 74 has a pair of circumferentially spaced stops 78 for limiting relative rotation between internal locator member 66 and external locator member 67.

Tubular shell 69 has a stepped land 80. Land 80 has a first step 82 received in an axial groove 84 in housing 12 to prevent relative rotation between external locator member 67 and housing 12. Land 80 has a second step 86 slidably engaged with the interior of housing 12 to effect a seal therebetween.

An axially inner end 88 of shell 70 has a radially inwardly directed lip 90 in abutment with an axially inner end 92 of shell 69 to limit axial insertion of internal locator member 66 in housing 12. Lip 90 has a relatively sharp peripheral edge 94 engaged with an angled surface 96 on housing 12 to effect a line contact for positively positioning the locator members and aligning stem member 54 and poppet 44 with inlet 20.

Internal locator member 66 and external locator member 67 are maintained in a rightwardmost (as shown in FIG. 1) axial position by means of plug 65 bearing against shells 69 and 70. Moreover, it is a feature of the present invention that plug 65 and external locator member 67, alone, are effective to maintain the position of outlet check assembly 26 adjacent outlet 24, such that check valve 10 can be operated when inlet check assembly 42 is removed for servicing.

It will be understood that the aforesaid construction of check valve 10 provides an angled check valve with dual check assemblies arranged to operate in opposite directions. Consequently, packaging requirements of the check assemblies are reduced and a compact valve housing 12 is employed.

Installation and servicing of the check assemblies is facilitated by the manner in which access to the housing interior is gained, that is, through axial opening 63. The construction of locator means 62 enables the insertion and removal of both inlet check assembly 42 and outlet check assembly 26 through common opening 63. In addition, the check valve is adapted to operate with inlet check assembly 42 or outlet check assembly 26 removed for service or replacement.

It is acknowledged that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A check valve comprising:
a valve housing;
inlet means for admitting fluid flow into the housing in a first direction;
outlet means for discharging fluid flow from the housing in a second direction generally perpendicular to said first direction;
an inlet check assembly in the housing for preventing the inlet means from discharging a flow from the housing, the inlet check assembly having an inlet valve member guided for movement in the first direction between a closed position and an open position;
an outlet check assembly in the housing for preventing the outlet means from admitting fluid flow into the housing, the outlet check assembly having an outlet valve member guided for movement in the second direction between a closed position and an open position; and
means associated with the housing for providing access to the housing interior to facilitate assembly and service of the check valve, the means comprising an opening in the housing through which the inlet check assembly and the outlet check assembly are assembled into and removed from the housing in the second direction.

2. The check valve according to claim 1, in which the housing has an inlet with a peripheral surface for seating the inlet valve member when the inlet valve member is in the closed position, the peripheral surface having an inner edge adapted to provide a line contact with the inlet valve member.

3. The check valve according to claim 2 in which the peripheral surface is angled away from the inner edge and opposite the first direction.

4. The check valve according to claim 1 in which the housing has an inlet with a peripheral surface for seating the inlet valve member when the inlet valve member is in the closed position, the check valve including locator means for aligning the inlet valve member with the inlet.

5. A check valve comprising:
a valve housing;
inlet means for admitting fluid flow into the housing in a first direction;
outlet means for discharging fluid flow from the housing in a second direction generally perpendicular to said first direction;
an inlet check assembly in the housing for preventing the inlet means from discharging a flow from the housing, the inlet check assembly having an inlet valve member guided for movement in the first direction between a closed position and an open position;
an outlet check assembly in the housing for preventing the outlet means from admitting fluid flow into the housing, the outlet check assembly having an outlet valve member guided for movement in the second direction between a closed position and an open position;

an inlet and an outlet, a first locator member for positioning the inlet check assembly adjacent to the inlet, and a second locator member for positioning the outlet check assembly adjacent to the outlet, the first locator member and the second locator member being movable relative to each other in the second direction to facilitate assembly and service of the check valve.

6. The check valve according to claim 5, including means for limiting relative movement between the first locator member and the second locator member in the second direction.

7. The check valve according to claim 5, including means for mounting the first locator member and the second locator member rotatable relative to each other about an axis substantially aligned with the second direction.

8. The check valve according to claim 7, including means for limiting relative rotation between the first locator member and the second locator member.

9. The check valve according to claim 5, including means for preventing rotation of the second locator relative to the housing about an axis substantially aligned with the second direction.

10. The check valve according to claim 5, including an opening in the housing through which the inlet check assembly and the outlet check assembly are assembled into and removed from the housing in the second direction, and a plug removably received in the opening and engaged with the first locator member and the second locator member to maintain the position of each when the check valve is in an assembled condition.

11. The check valve according to claim 5, including means for guiding the inlet valve member for movement in the first direction relative to the first locator member.

12. The check valve according to claim 11 in which the means for guiding comprises a stem on one of the inlet valve member and the first locator member and a complementary opening for receiving the stem on the other of the inlet valve member and the first locator member.

13. The check valve according to claim 12 in which a spring is interposed between the first locator member and the inlet valve member.

14. The check valve according to claim 12 in which the inlet valve member has an upstanding tab accessible through the opening in the housing to facilitate removal of the inlet check assembly.

15. The check valve according to claim 12, including means for preventing relative rotation between the inlet valve member and the first locator member about an axis substantially aligned with the first direction.

16. The check valve according to claim 5 including a line contact between an inner axial end of the second locator member and the housing to positively position the second locator member and the first locator member.

17. A check valve comprising:

a valve housing;

inlet means for admitting fluid flow into the housing in a first direction;

outlet means for discharging fluid flow from the housing in a second direction;

an inlet check assembly in the housing for preventing the inlet means from discharging fluid flow from the housing, the inlet check assembly having an inlet valve member guided for movement between a closed position and an open position;

an outlet check assembly in the housing for preventing the outlet means from admitting fluid flow into the housing, the outlet check assembly having an outlet valve member guided for movement between a closed position and an open position;

a generally cylindrical opening in the housing through which the inlet check assembly and the outlet check assembly are admitted into and removed from the housing, the opening extending axially in the second direction;

a plug removably received in the opening; and locator means coaxial with the opening and held in position by the plug for maintaining the outlet check assembly adjacent the outlet.

18. The check valve according to claim 17 in which the locator means comprises a first tubular locator member received in the opening and disposed between the plug and the outlet check assembly.

19. The check valve according to claim 18 in which the locator means comprises a second tubular locator member coaxial with the first tubular locator member and held in position by the plug for maintaining the inlet check assembly adjacent the inlet.

* * * * *